United States Patent [19]
Hoshino et al.

[11] Patent Number: 5,820,212
[45] Date of Patent: Oct. 13, 1998

[54] AUTOMOTIVE SEAT

[75] Inventors: Akihiko Hoshino; Mineji Kitsuta, both of Kanagawa, Japan

[73] Assignee: Ikeda Bussan Co., Ltd., Ayase, Japan

[21] Appl. No.: 831,697

[22] Filed: Apr. 10, 1997

[30] Foreign Application Priority Data

Apr. 10, 1996 [JP] Japan .................................. 8-113091
Apr. 10, 1996 [JP] Japan .................................. 8-113092

[51] Int. Cl.$^6$ .................................................. A47C 27/00
[52] U.S. Cl. .................................... 297/218.5; 297/218.1
[58] Field of Search ........................ 297/452.59, 452.58, 297/452.6, 218.3, 218.5, 228.13, DIG. 1, DIG. 2, 218.1, 219.1; 247/265 H

[56] References Cited

U.S. PATENT DOCUMENTS

| | | | |
|---|---|---|---|
| 3,630,572 | 12/1971 | Homier | 297/452.6 |
| 5,478,134 | 12/1995 | Bernard et al. | 297/452.59 X |
| 5,586,807 | 12/1996 | Taggart | 297/452.59 X |

FOREIGN PATENT DOCUMENTS

| | | |
|---|---|---|
| 63-120998 | 8/1988 | Japan . |
| 2-9168 | 1/1990 | Japan . |
| 2-89997 | 7/1990 | Japan . |
| 6-277373 | 10/1994 | Japan . |
| 6-312066 | 11/1994 | Japan . |

*Primary Examiner*—Milton Nelson, Jr.
*Attorney, Agent, or Firm*—Foley & Lardner

[57] ABSTRACT

A seat cushion comprises a seat frame having a generally rectangular shape; a pad member integrally molded on the seat frame and an outer skin member covering the pad member. The pad member is formed at a back side thereof with a plurality of recesses into which given parts of the seat frame are partially exposed. Each given part is placed on a top of a laterally extending ridge of the pad member while being joined thereto. A plurality of hook units are employed for fastening the outer skin member to the pad member. Each hook unit includes a generally U-shaped hook member and a flexible strip which are integrally molded. The hook member is operatively engaged with the given part of the seat frame and the flexible strip is sewed to a leading end of the outer skin member.

7 Claims, 4 Drawing Sheets

AUTOMOTIVE SEAT

BACKGROUND OF THE INVENTION

1. Field of the Invention

The present invention relates in general to seats, and more particularly to automotive seats. More specifically, the present invention is concerned with the automotive seats of a type which generally comprises a seat frame, a pad member held by the frame, an outer skin member covering the pad member and hook means fastening the outer skin member to the pad member.

2. Description of the Prior Art

In order to clarify the task of the present invention, two earlier technologies in automotive seats will be described with reference to some of the accompanying drawings.

In FIGS. 4A, 4B and 4C, there is shown a seat cushion 1A of an automotive seat to which one earlier technology is practically applied. As is understood from FIG. 4A, the seat cushion 1 generally comprises a rectangular seat frame 2, a pad member 3 integrally molded on the seat frame 2 and an outer skin member 5 covering the pad member 3. The pad member 3 is of a foamed plastic, such as foamed polyurethane or the like. The outer skin member 5 is of a polyvinyl chloride (PVC) or the like.

To fasten the outer skin member 5 to the pad member 3, plastic hook members 7 are used which are sewed to a leading end 5a of the outer skin member 5. As is seen from FIGS. 4B and 4C, each hook member 7 is generally U-shaped and has a crook part 7a hooked to the seat frame 2 and a base part 7b sewed to the leading end 5a of the outer skin member 5. For engaging the crook part 7a with the seat frame 2, the pad member 3 is formed at a bottom side thereof with a recess 3a into which a front part of the seat frame 2 is partially exposed.

In FIGS. 5 and 6, there is shown the other seat cushion 1B to which the other earlier technology is practically applied. It is to be noted that FIG. 5 is a bottom view of the seat cushion 1A. Like in the above-mentioned one 1A, the seat cushion 1B comprises a rectangular seat frame 2, a pad member 3 integrally molded on the seat frame 2 and an outer skin member 5 covering the pad member 3. Designated by numeral 6 is an inner frame which extends between front and rear parts of the rectangular seat frame 2. The inner frame 6 has front and rear end portions which are projected outward to form front and rear mounting portions 6a and 6b. That is, upon assembly of the seat in a vehicle, the front and rear mounting portions 6a and 6b are put on a seat slide mechanism (not shown) arranged on a vehicle floor "VF" (see FIG. 6).

To fasten the outer skin member 5 to the pad member 3, an elongate plastic bar 8 is used which is held in a bag portion of a strip 5b sewed to a leading end 5a of the outer skin member 5, and a plurality of ohm-clips 9 are used which fasten the bar 8 to the seat frame 2. The strip 5b is made of none woven fabric.

Other earlier technologies in automotive seats are shown in Laid-open Patent Applications 6-277373 and 6-312066 and Laid-open Utility Model Applications 63-120998, 2-9168 and 2-89997.

However, the above-mentioned seat cushions 1A and 1B have some drawbacks which will be described in the following.

That is, in the seat cushion 1A of FIGS. 4A, 4B and 4C, the work for engaging the hook members 7 to the exposed seat frame 2 is troublesome. In fact, for achieving the engagement, each hook member 7 has to cut, with the crook part 7a thereof, a laterally extending ridge 3b (see FIG. 4B) of the pad member 3 before making engagement with the seat frame 2. However, due to the stiffness of the outer skin member 5, handling of each hook member 7 for the engagement with the seat frame 2 is not easily made. The ridge 3b of the pad member 3 is inevitably produced or left when the recess 3a is formed in the back side of the pad member 3. As is understood from FIG. 4C, such hook engaging work becomes much difficult as the width "W" of the hook member 7 increases. Furthermore, when a design change is made in the seat cushion 1A even in a small scale, the process for the engagement becomes remarkably changed, which lowers the labor effectiveness of workers and/or the productive efficiency of automatic assembling machine.

In the seat cushion 1B of FIGS. 5 and 6, the work for connecting the bar 8 and the seat frame 2 with the ohm-clips 9 is troublesome. In fact, such work tends to cause production of unsightly creases of the outer skin member 5 particularly at portions which are pulled by the ohm-clips 9. Furthermore, when it becomes necessary to disassemble the seat cushion 1B, the work for detaching the ohm-clips 9 from the seat frame 2 takes a greater time.

SUMMARY OF THE INVENTION

It is therefore an object of the present invention to provide an automotive seat which is free of the above-mentioned drawbacks.

According to the present invention, there is provided a seat which comprises a seat frame having a generally rectangular shape; a pad member integrally molded on the seat frame; an outer skin member covering the pad member; means for defining in a back side of the pad member a plurality of recesses into which first given parts of the seat frame are partially exposed, each first given part being placed on a top of a laterally extending ridge of the pad member while being joined thereto; and a plurality of hook units for fastening the outer skin member to the pad member, each hook unit including a generally U-shaped hook member and a flexible strip which are integrally molded, the hook member being operatively engaged with the given part of the seat frame and the flexible strip being sewed to a leading end of the outer skin member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 3B, there is shown a seat cushion 11 of an automotive seat to which the present invention is practically applied.

Figure 1:
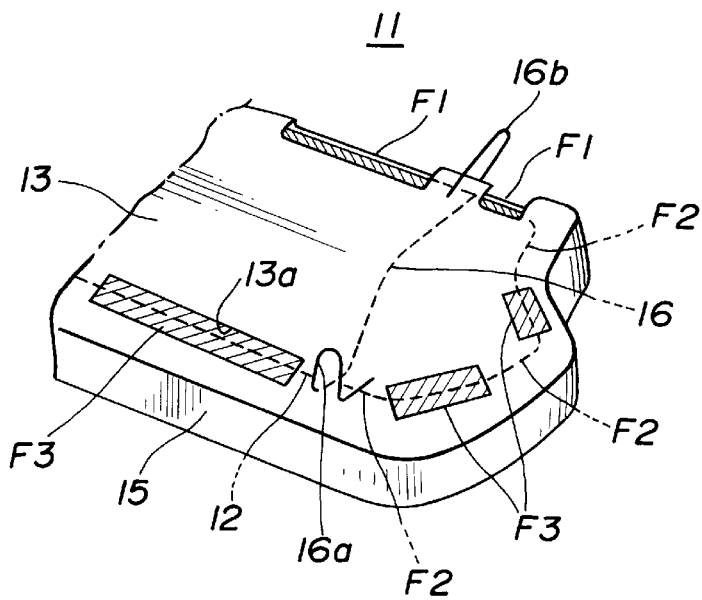
FIG. 1 is a bottom view of a seat cushion to which the present invention is practically applied.
Figure 2A:
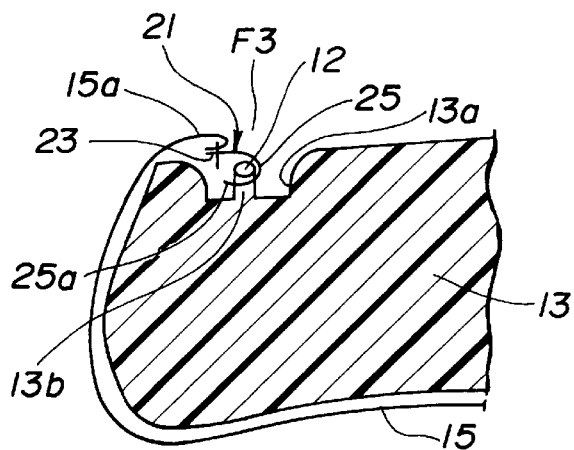
FIG. 2A is an enlarged sectional view of one part of the seat cushion according to the present invention.
Figure 2B:
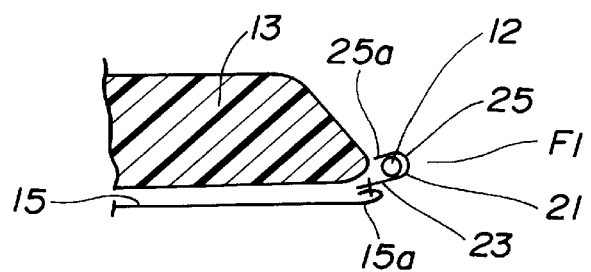
FIG. 2B is a sectional view of another part of the seat cushion according to the present invention.

As is seen from FIGS. 1, 2A and 2B, the seat cushion 11 comprises a generally rectangular seat frame 12, a pad member 13 integrally molded on the seat frame 12 and an outer skin member 15 covering the pad member 13. The seat frame 12 is constructed of a metal bar. The pad member 13 is of a foamed plastic, such as, foamed polyurethane or the like. Designated by numeral 16 is an inner frame which extends between front and rear parts of the rectangular seat frame 12. The inner frame 16 has front and rear end portions which are projected outward to form front and rear mounting portions 16a and 16b. That is, upon assembly of the seat in a vehicle, the front and rear mounting portions 16a and 16b are disposed on a seat slide mechanism (not shown).

To fasten the outer skin member 15 to the pad member 13, a unique measure is practically employed in the present invention, which will be described in the following.

As is seen from FIG. 1, the pad member 13 has at its back side first portions F1 where the seat frame 12 is fully exposed to the outside of the pad member 13, second portions F2 where the seat frame 12 is fully embedded in the pad member 13 and third portions F3 where the seat frame 12 is partially exposed to the outside of the pad member 13.

More specifically, as is seen from FIG. 2B, at each first portion F1, the seat frame 12 is spaced from the pad member 13. As is understood from FIGS. 1 and 2A, the third portions F3 of the pad member 13 are each provided by forming an elongate recess 13a in the back side of the pad member 13. Thus, at each third portion F3, the seat frame 12 is placed on a top of a laterally extending ridge 13b of the pad member 13 while being joined thereto. It is to be noted that the laterally extending ridge 13b is inevitably produced or left when the corresponding elongate recess 13a is formed in the back side of the pad member 13. Each elongate recess 13a is chamfered.

As is seen from FIGS. 2A and 2B, hook units 21 are employed for fastening the outer skin member 15 to the pad member 13. The hook units 21 are sewed to leading end portions 15a of the outer skin member 15, which are hooked to the partially exposed seat frame 12 at the third portions F3 and the fully exposed seat frame 12 at the first portions F1 of the pad member 13, respectively.

Figure 3A:
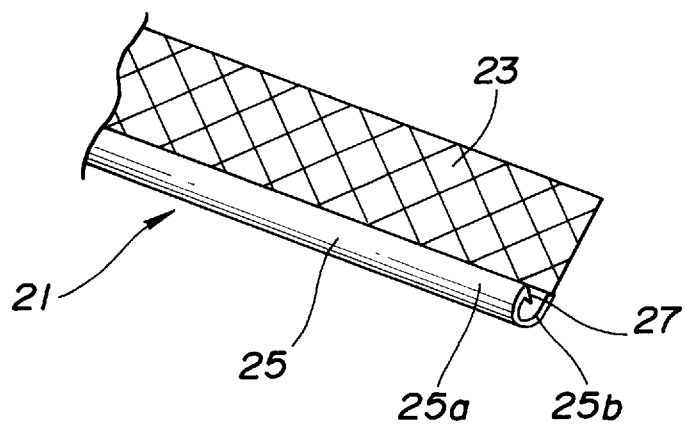
FIG. 3A is a perspective, but partial, view of a hook unit employed in the present invention.
Figure 3B:
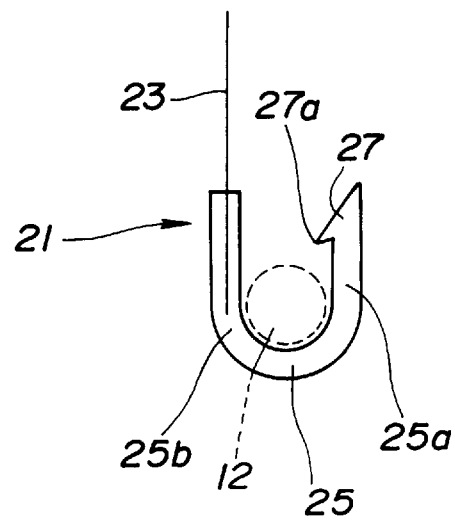
FIG. 3B is an enlarged sectional view of the hook unit.
Figure 4A:
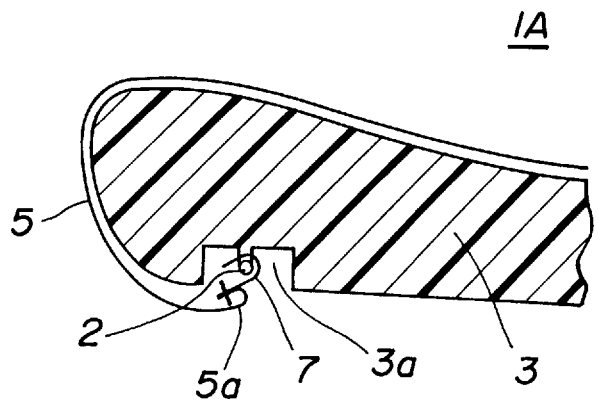
Fig. 4A is a sectional view of one seat cushion to which an earlier seat technology is practically applied.
Figure 4B:
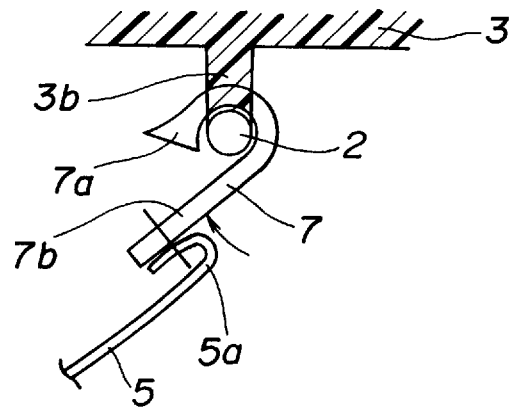
FIG. 4B is an enlarged sectional view of an essential portion of the seat cushion of FIG. 4A.
Figure 4C:
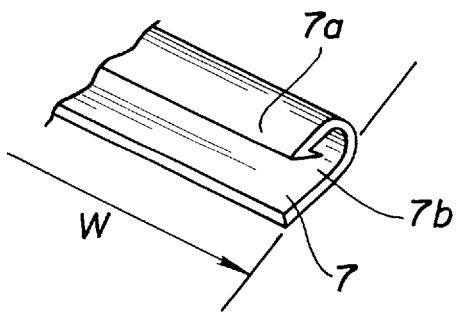
FIG. 4C is a perspective, but partial, view of a hook member employed in the seat cushion of FIG. 4A.
Figure 5:
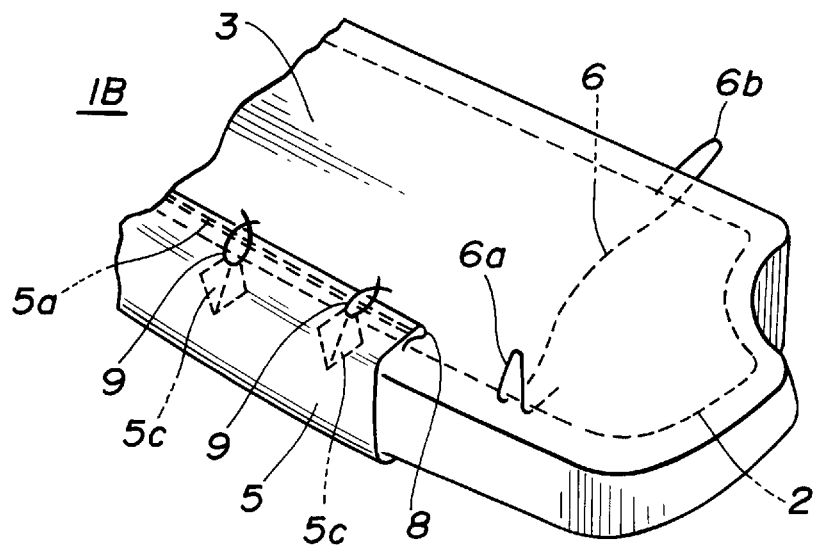
FIG. 5 is a bottom view of another seat cushion to which the other earlier seat technology is practically applied.
Figure 6:
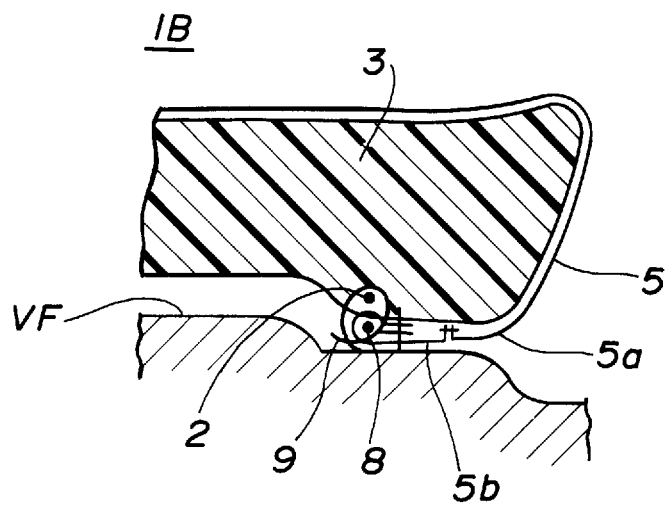
FIG. 6 is an enlarged sectional view of one part of the seat cushion of FIG. 5.

As is seen from FIGS. 3A and 3B, each hook unit 21 comprises a generally U-shaped plastic hook member 25 which is engaged with the seat frame 12 and a flexible strip 23 which has one end embedded in the hook member 25. That is, the hook unit 21 is produced through an integral molding. The other end of the flexible strip 23 is sewed to the leading end portion of the outer skin member 15.

The hook member 25 is constructed of a rigid plastic, such as polypropylene (PP), polyethylene (PE), acrylonitrile-butadien-styrene (ABS) or the like, and the flexible strip 23 is constructed of non woven fabric, woven fabric, victoria lawn, shirting, cotton tape, plastic sheet or the like.

As is best shown in FIG. 3B, the hook member 25 comprises a crook part 25a which has a sharpened end portion 27 and a base part 25b which has one end of the flexible strip 23 embedded therein. The sharpened end portion 27 has a backwardly projected ridge 27a as shown. Due to provision of such sharpened end portion 27, the hook member 25 can easily cut the laterally extending ridge 13b of the pad member 13 when brought into engagement with the partially exposed portion of the seat frame 12 (see FIG. 2A).

In the following, advantages of the present invention will be described.

First, due to provision of the flexible strip 23 between the hook member 25 and the outer skin member 15, handling of the hook member 25 for engagement with the seat frame 12 is very facilitated. The flexible movement of the hook member 25 is particularly needed when the hook member 25 has to cut the laterally extending ridge 13b, as is understood from FIG. 2A. Furthermore, such flexible movement of the hook member 25 can solve the above-mentioned various problems possessed by the seat cushions 1A and 1B of FIGS. 4A to 6.

Second, due to provision of the flexible strip 23, fixing of the hook member 25 to the outer skin member 15 via sewing is very faciliated.

Third, the hook unit 21 can be applied to various types seat only by adjusting the length of the flexible strip 23.

Although the above description is directed to only the seat cushion 11 of an automotive seat, the present invention is applicable to seat cushions of other seats and seat backs of the same.

What is claimed is:

1. A seat comprising:

a seat frame having a generally rectangular shape;

a pad member integrally molded on said seat frame;

an outer skin member covering said pad member;

means for defining in a back side of said pad member a plurality of recesses into which first given parts of said seat frame are partially exposed, each first given part being placed on a top of a laterally extending ridge of the pad member while being joined thereto; and a plurality of hook units for fastening said outer skin member to said pad member, each hook unit including a generally U-shaped hook member and a flexible strip which are integrally molded, said hook member being operatively engaged with the given part of said seat frame and said flexible strip being sewed to a leading end of said outer skin member.

2. A seat as claimed in claim 1, further comprising means for defining in the back side of said pad member a plurality of portions where second given parts of said seat frame are fully exposed to the outside of the pad member, each second given part being operatively engaged with the hook member of the hook unit.

3. A seat as claimed in claim 1, in which the hook member of each hook unit comprises a rigid plastic selected from the group consisting of polypropylene (PP), polyethylene (PE) and acrylonitrile-butadien-styrene (ABS).

4. A seat as claimed in claim 1, in which the flexible strip of each hook unit comprises a material selected from the group consisting of non-woven fabric, woven fabric, Victoria lawn, shirting, cotton tape and plastic sheet.

5. A seat as claimed in claim 1, in which said pad member is constructed of a foamed polyurethane and said outer skin member is constructed of a polyvinyl chloride (PVC).

6. A seat as claimed in claim 1, in which the engagement of said hook member with the given part of said seat frame is achieved by cutting said laterally extending ridge of the pad member with said hook member.

7. A seat as claimed in claim 6, in which said hook member comprises:
   a crook part having a sharpened end portion and a backwardly projected ridge; and
   a base part having one end of said flexible strip embedded therein.

* * * * *